E. W. WIESE, Sr.
MACHINE FOR SHAPING CRUSH WORK.
APPLICATION FILED NOV. 26, 1920.

1,424,789.

Patented Aug. 8, 1922.
5 SHEETS—SHEET 1.

INVENTOR
Edward W. Wiese, Sr.
BY
J. R. Cornwall
ATTORNEY

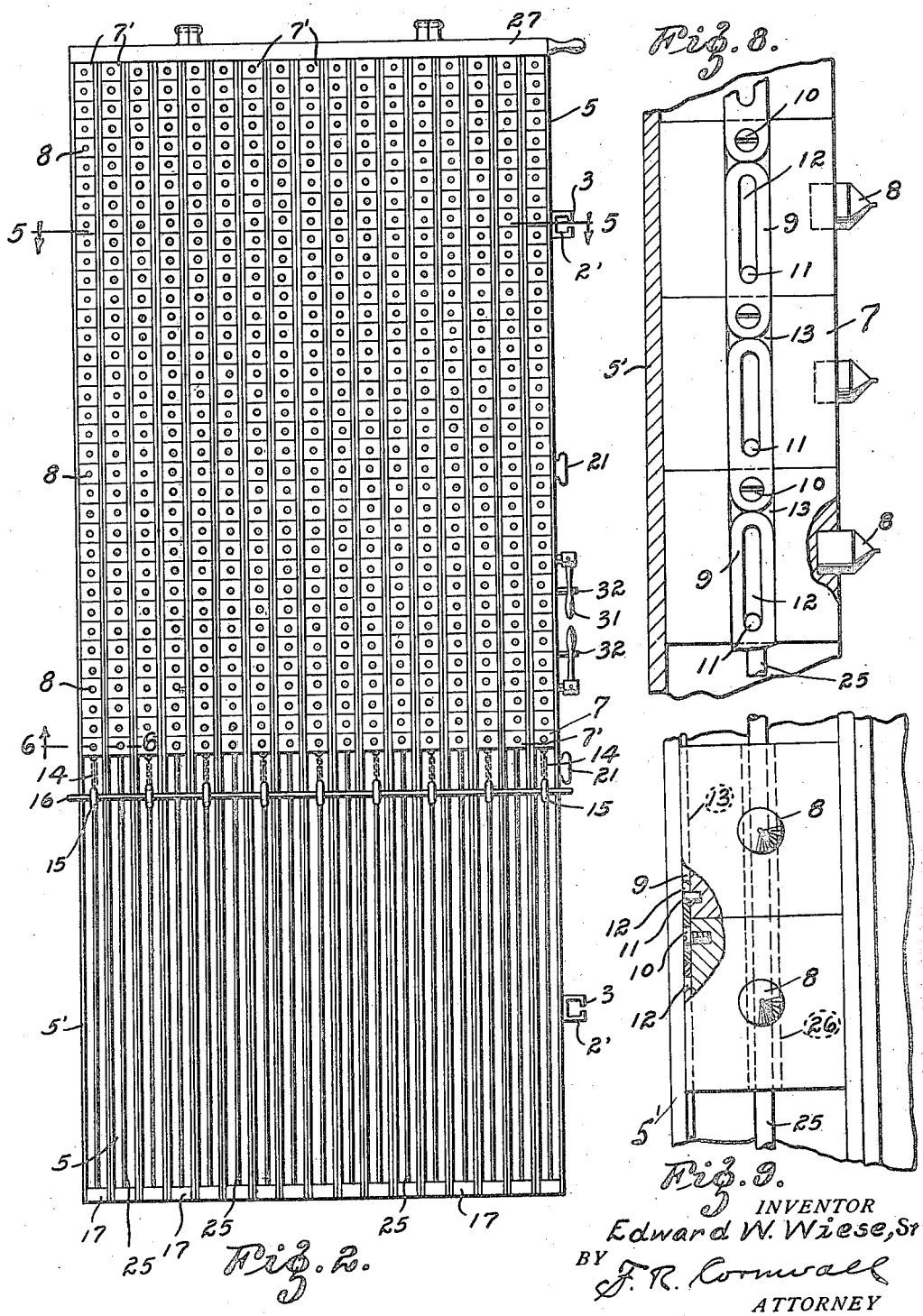

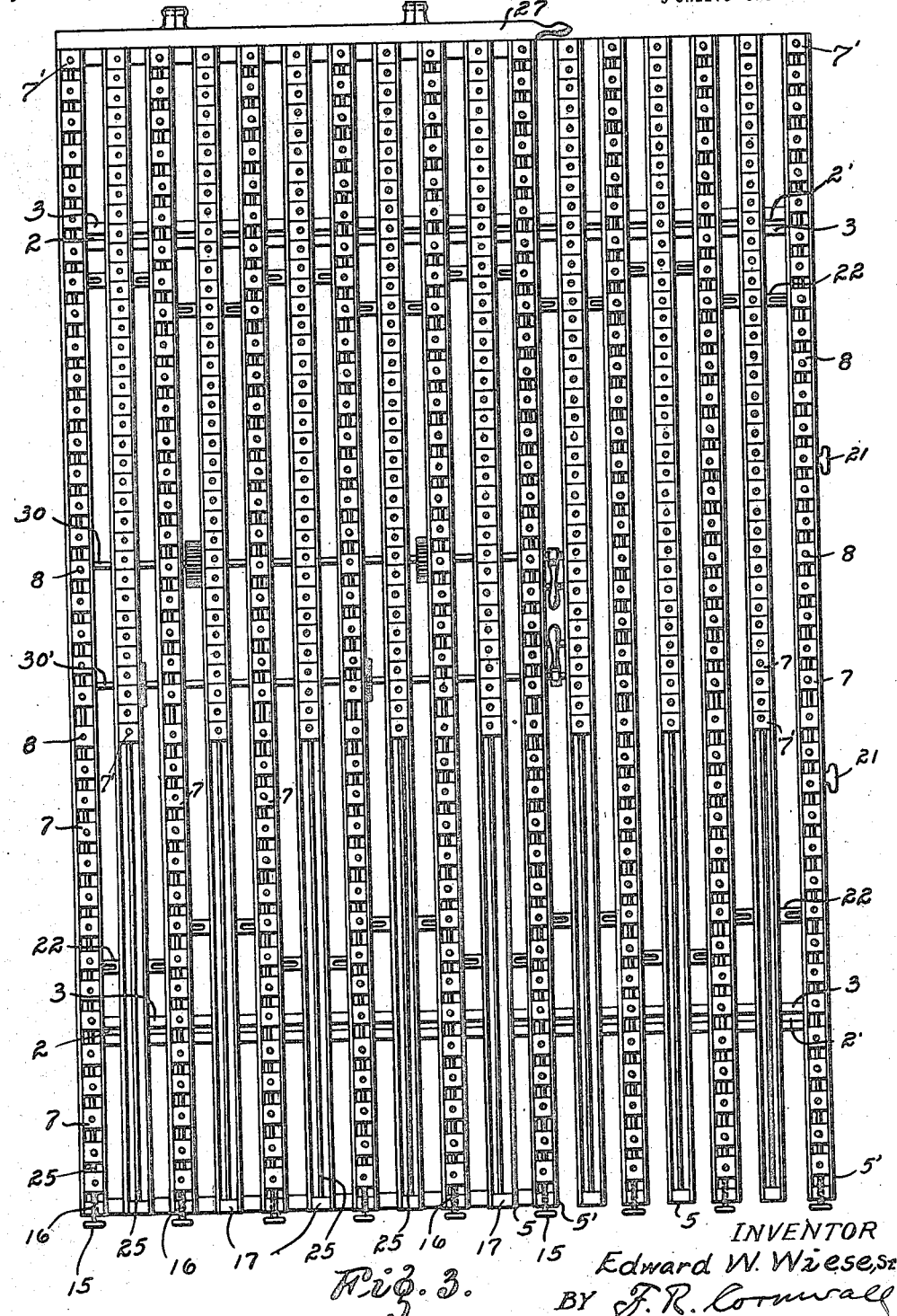

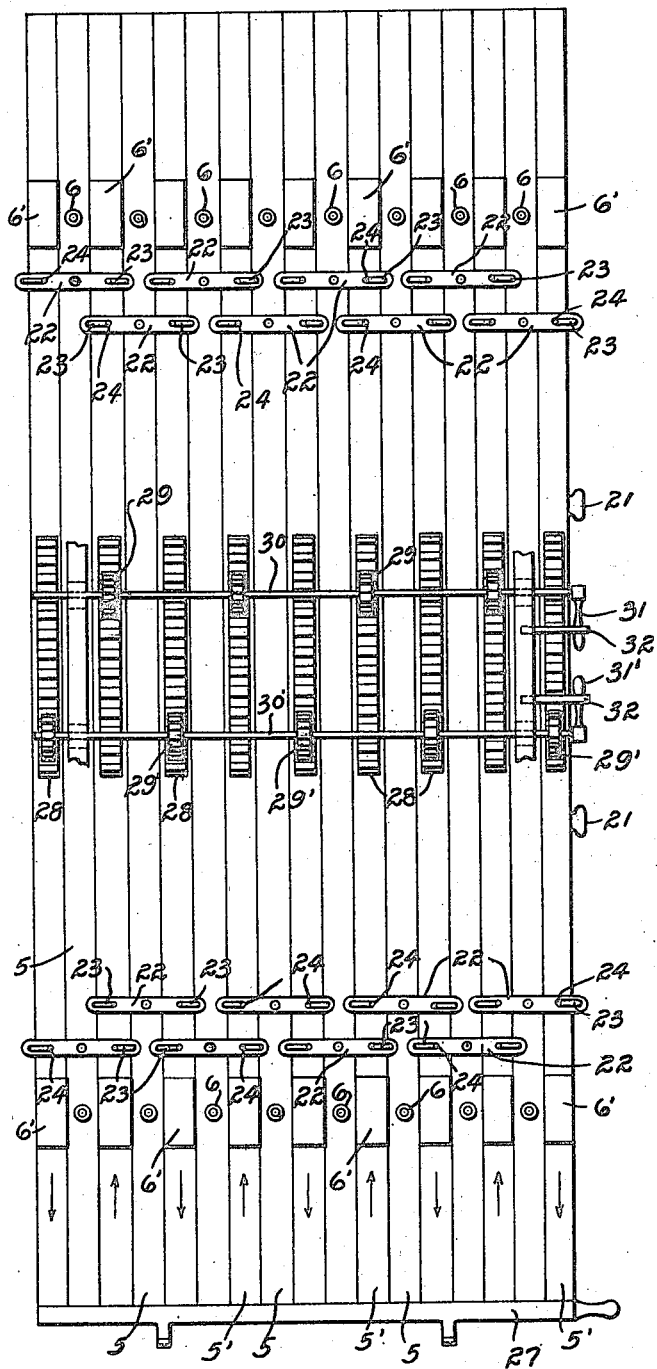
Fig. 4.
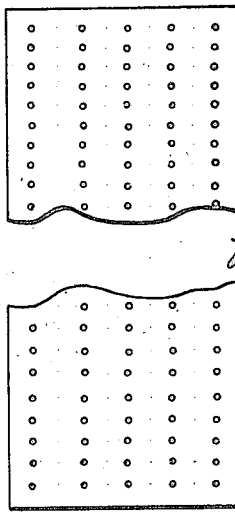
Fig. 11.
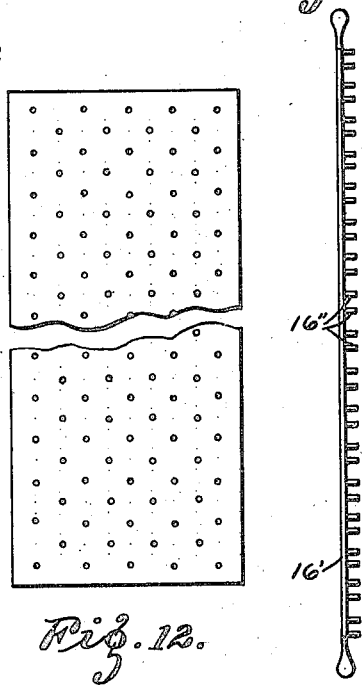
Fig. 13.
Fig. 12.
INVENTOR
Edward W. Wiese, Sr.
BY
J. R. Cornwall
ATTORNEY

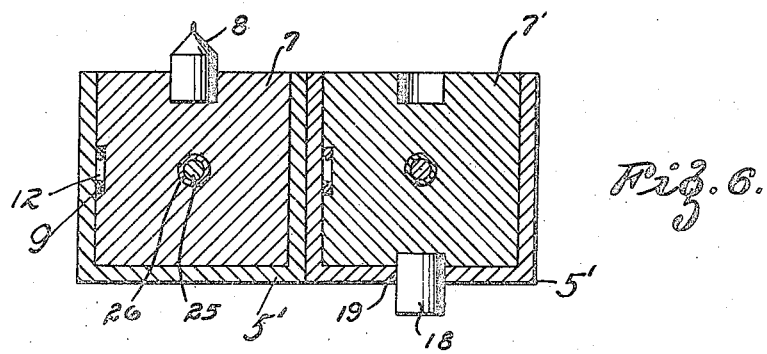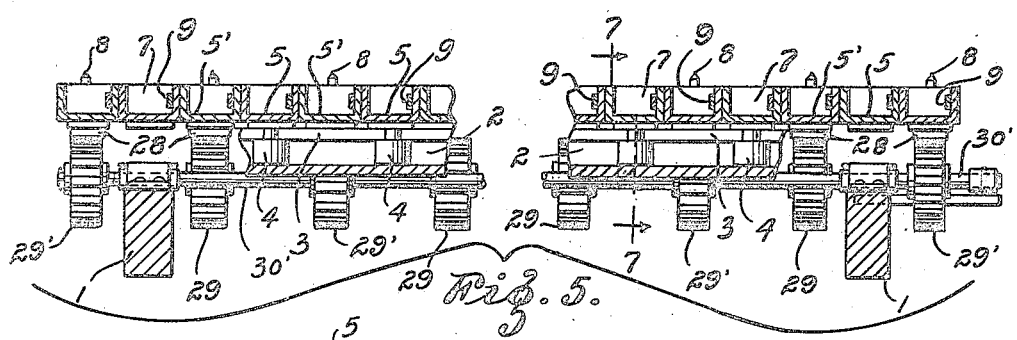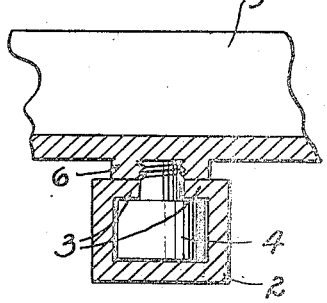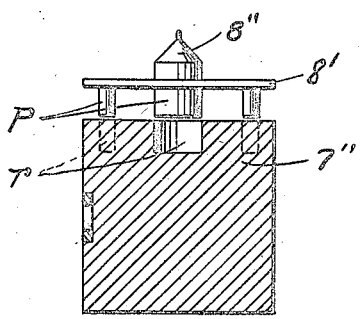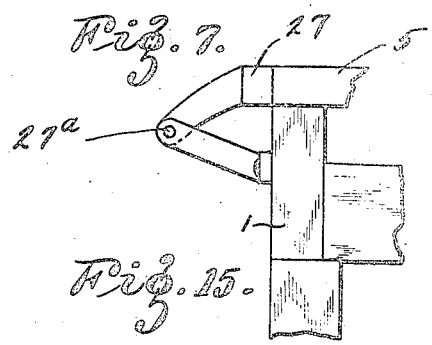

UNITED STATES PATENT OFFICE.

EDWARD W. WIESE, SR., OF ST. LOUIS, MISSOURI.

MACHINE FOR SHAPING CRUSH WORK.

1,424,789.  Specification of Letters Patent.  Patented Aug. 8, 1922.

Application filed November 26, 1920. Serial No. 426,416.

*To all whom it may concern:*

Be it known that I, EDWARD W. WIESE, Sr., a citizen of the United States, residing at St. Louis, Missouri, have invented a certain new and useful Improvement in Machines for Shaping Crush Work, of which the following is a full, clear, and exact description, such as will enable others skilled in the art to which it appertains to make and use the same, reference being had to the accompanying drawings, forming part of this specification.

My invention has relation to improvements in machines for giving to certain kinds of cloth a particular finish, that is, not a finishing texture but more of a finish in surface shape. The cloth used for this purpose is generally a silk or satin cloth and after being shaped on my improved machine the resulting product is called "crush-work." The machine is provided with certain adjustments whereby different shapes of crush-work may be formed.

The object of the present invention is to provide a machine that may give the crush-work a wrinkled effect in one or more directions, or the effect given to the crush-work may be what is known as a wave effect, and the description of the machine will be particularly directed to an embodiment that may produce such wave effect.

A further object is to provide a machine of the above character that is simple in operation, one that is certain in its results, and one that normally may be sufficiently compact so as not to occupy a large floor space.

Further and other advantages will be better apparent from a detailed description of the invention in connection with the accompanying drawings, in which—

Figure 2 is a plan view of the same in its normal or contracted position.

Figure 3 is a plan view of the machine in its extended position or with the parts in the relation occupied when the cloth to be worked on is placed on the machine.

Figure 4 is a bottom plan showing the means whereby the adjustment for producing a wave effect in the cloth is obtained.

Figure 5 is a vertical cross section on the line 5—5 of Figure 2.

Figure 6 is a vertical sectional detail on the line 6—6 of Figure 2.

Figure 7 is a vertical sectional detail on the line 7—7 of Figure 5.

Figure 8 is an enlarged side elevation of the blocks and connections whereby one adjustment of the machine is obtained.

Figure 9 is an enlarged top plan of said blocks.

Figure 11 is a diagrammatic view showing the relative positions of the styli that hold the cloth in place for giving a certain shape to the cloth known as a wave effect.

Figure 12 is a diagrammatic view similar to Figure 11, the styli being arranged, however, for giving a different shape to the cloth, known as a corrugated effect.

Figure 13 is a detached view of the rod whereby the stylus carrying blocks are restored to their normal positions after being extended.

Figure 14 is a plan view of a piece of cloth after the same has been given a wave effect, herein alluded to.

Figure 15 is a side elevation of the end of the table showing the manner of mounting the guide bar for the channels.

Figure 16 is a modification of a stylus carrying block and stylus plate therefor.

Figure 1:
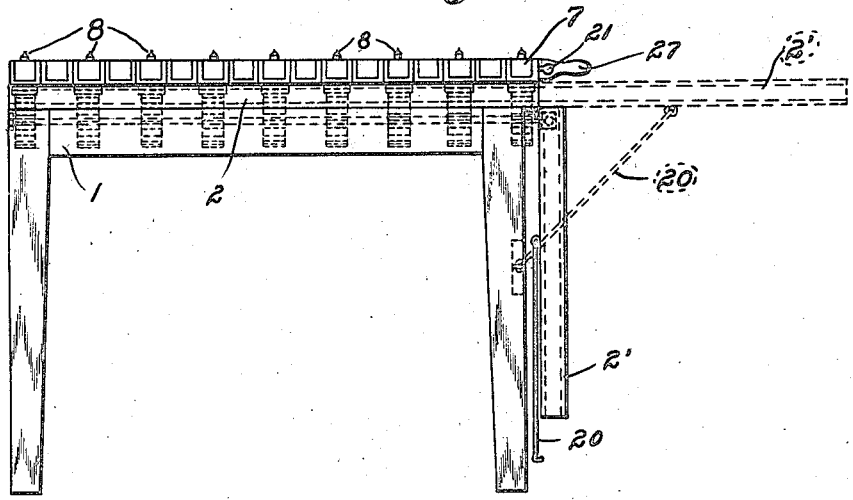
Figure 1 is an end elevation of my improved machine.
Figure 10:
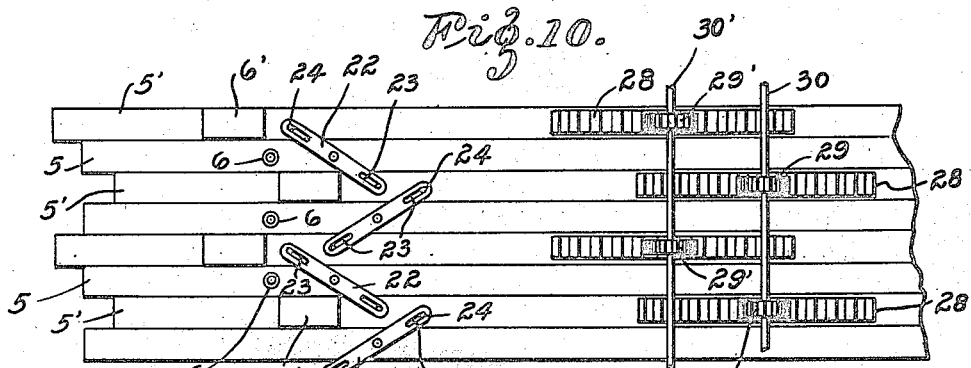
Figure 10 is a fragmentary bottom plan showing the parts of the machine in one adjusted position.

Referring more particularly to the drawings, 1 represents a table having mounted thereon in suitable spaced apart relation, a pair of channel-shaped rails 2, the sides of which rails are provided with inwardly turned flanges 3 for the purpose of confining within the rail the heads of guide studs 4, said guide studs being secured in the bottom of alternate channels 5 of a series of juxtaposed channels 5, 5'. The channels 5, 5' are arranged normally in abutting relation, there being a sufficient number of channels to accommodate any predetermined size of cloth that is desired to work on. All of the channels 5, 5' are not provided with guide studs, but as will appear from Figure 5, each alternate channel 5 is provided with two such guide studs, the purpose of which will presently appear. Beneath each channel 5 a pair of filler blocks 6 are welded or otherwise suitably secured to the channel in such position that these filler blocks will be immediately over the rails 2 and ride thereon, and it is into these filler blocks 6 that the studs 4 are screwed, there being no projection into the channel 5, as said channel must be provided with an absolutely smooth surface to permit stylus carrying blocks 7 to slide therein. There are also filler blocks 6' on channels 5' which ride on the rails 2, said filler blocks being necessary to bring the channels 5' on the same level as channels 5. All of the channels 5, 5' are adapted to receive the stylus carrying blocks 7 but in making crush-work with a wave effect only the blocks in alternate channels 5 will be provided with styli 8. However, in producing effects other than wave effects, all of the blocks may be provided with styli or the styli may be omitted from certain of the blocks, depending upon the shape that it is desired to give to the cloth. All of the channels 5 are provided with a series of blocks 7 seated within the channels throughout a certain part of their length, in the present instance, two-thirds of their length, and each block of the series is connected to the adjacent block by means of a link 9, said link being secured to one block by a screw 10, the adjacent block being provided with a stud 11 operating through a slot 12 in the link.

The blocks are provided with transverse recesses 13, said recesses, together constituting a continuous groove wherein the links 9 are seated. The object of thus countersinking or depressing the links 9 is to enable the blocks to present to the channels, wherein they slide, a smooth, even surface so that the blocks may fit snugly therein without unnecessary play.

In the present instance, the blocks 7 of channels 5' are extensible and are provided with a connecting chain 14 secured to the end block of the series, a ring 15 being fixed to the free end of the chain. By means of the chains and rings, the blocks 7 of all the channels 5' may be extended simultaneously by merely slipping a rod 16 through the rings 15 and drawing said rod outwardly, whereupon the blocks will be extended in the channels throughout the full length of said channel, by virtue of their slotted link connections. The ends of the channels are provided with filler blocks 17 which will act as a stop upon being engaged by the end block 7 of each extensible series.

As before stated, in producing a wave effect to the cloth, each row of blocks positioned in the channels 5 will not be moved, said blocks being anchored therein by virtue of the end block 7' being provided with a stud 18 which is adapted to project through an opening 19 in the channel. However, should it be desired at any time to extend the blocks in all of the channels 5 and 5', the end block 7' may be replaced with blocks similar to those in the extensible series, which blocks may also be provided with connecting chains and rings to be engaged by the rod 16. The blocks 7' on the outer end of each extensible series are provided with a pin 18 projecting through an opening 19 in the channel, the same as the inner end blocks 7' of the non-extensible series, thus making said end block stationary.

The above description relates to one adjustment of the machine, that is, the means whereby the blocks may be extended longitudinally in the channels 5'. In addition to this adjustment, the channels themselves may be separated, and to permit of such separation, I provide an extension rail 2' for each rail 2 which, for purpose of economy of space, is shown hinged to the rail 2. When it is desired to separate the channels laterally, the extension rails 2' are raised to form a continuation of the rails 2, props 20 being provided to hold said extensions 2' in their raised positions.

The side of the machine whereon the extensions 2' are placed, may be considered as the front of the machine, and the outermost channel 5' on this side is provided with a pair of handles 21 which are availed of by the operator in extending the channels.

In order that all of the channels may be extended, said channels are provided with suitable connections on their undersides, which connections, in the present instance, consist of slotted links 22 pivoted on the channels 5 which are provided with guide studs 4. The opposite ends of the links 22 are provided with slots 23, 23, which slots are adapted to receive pins 24, 24 projecting from the lower surface of alternate channels 5'.

In Figure 4, the channels and links 22 are shown in their normal or contracted position, but when the operator pulls on the handles 21, the pins 24 of the first channel 5' will slide through their slots 23 of links 22 and when said pins have reached the end of the slots, the next adjacent channel will be pulled after which each succeeding channel will be drawn outwardly the full length of the slots in the links 22. In the present instance, the machine is designed so that the channels may be extended laterally a distance equal to one-half their normal combined width and the slots 23 and the links are of a length to permit of this extension.

In Figure 3, the channels are shown extended laterally and the stylus carrying blocks are also shown extended longitudinally in each alternate channel.

It will be observed that the stylus carrying blocks 7, in addition to being confined within their channels, are adapted to slide on guide rods 25 centrally disposed in the channels, and bushings 26 are provided in the blocks to take up whatever wear there may be due to this sliding movement of the blocks on the rods. However, the guide rods 25 are not indispensable but are utilized to insure the blocks remaining in place in the channels.

In the operation of my invention, I prefer to extend the blocks longitudinally in the channels first, after which I extend the channels laterally and thereby space the styli their maximum distance in both directions. With the machine in this extended position, the cloth is placed over the styli, which penetrate the cloth and hold it in place, whereupon the channels as well as the stylus carrying blocks are contracted to their normal positions. In restoring the blocks 7 to their contracted or normal positions, I prefer to utilize for this purpose a bar 16' having pins 16'' projecting in pairs therefrom, said bar being positioned in front of the end blocks 7 with the pins 16'' straddling the rods 25 whereupon pushing on the bar will restore the blocks simultaneously. Thus contracting the styli with the cloth engaged will cause the cloth to be wrinkled in an orderly manner and produce a particular surface effect which surface-effect may be made permanent by laying over the cloth a piece of backing material and stitching said backing material to the work at the points where said work is penetrated by the styli.

Figure 14:
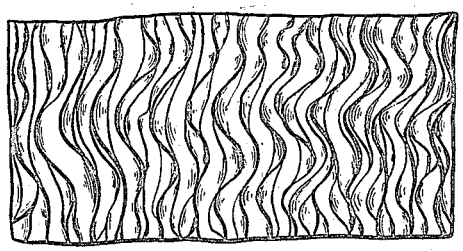

Crush-work produced, as just described, will not, however, have a wave effect, which is most desired, in order to produce which, another operation of the machine is necessary. This last operation consists in imparting a zigzag motion to the channels, after the cloth has been positioned and the styli contracted as above described. This is done as follows:—A guide bar 27 is provided at one end of the machine and disposed adjacent the channels when said channels are in their normal positions, the object of said guide bar being to insure that all of the channels will normally be in alignment. Secured on the underside of alternate channels 5', that is, on those channels which are not provided with guide studs 4 seated in the rails 2, are racks 28, each alternate rack being engaged by pinions 29 mounted on a shaft 30 on the outer end of which shaft is an operating handle 31. The racks 28 not so engaged by pinions 29 are engaged by pinions 29' mounted on a shaft 30' having an operating handle 31' on its end adjacent the front of the machine. This disposition of the pinions 29 and 29', that is, said pinions being opposed to one another, will, on raising the handles 31, 31' move alternate racks 28, together with their channels, in opposite directions. This movement of alternate channels in opposite directions will likewise cause the styli carried in said channels to be moved in opposite directions and thus impart to the work held by said styli a zigzag or wave effect, such as shown in Figure 14.

Obviously, some means must be provided for causing the racks 28, after the channels have been extended, to again mesh with the pinions 29 and 29' upon restoring the channels to their normal or contracted position. The guide bar 27 causes the channels, and consequently the racks, to line up in their proper positions upon being restored to normal, and the pinions 29 and 29' caused to assume a position that will insure meshing with the racks 28 by being brought to a predetermined position after having been operated. This predetermined position is ascertained and suitable pins 32 are secured in the table 1 beneath the handles 31 and 31' so that said handles on being restored to normal will engage said pins, thereupon insuring that the pinions 29 and 29' will be arrested in a proper position to mesh with the racks 28. In other words, means are provided for insuring the racks returning to normal position and likewise for insuring the pinions to return to normal position after having been operated.

In order to permit of the zigzag motion of the channels 5, the guide bar 27 is hinged to the table at 27ª so that when it is desired to zigzag the channels, the guide bar 27 can be dropped downwardly out of the way of said channels.

In Figure 16 I have shown a modified form of block 7' which is adapted to receive a stylus-plate 8' having a stylus 8'' projecting upwardly therefrom. The plate 8' is provided with projections p fitting into recesses r in the block.

Thus it is seen that my improved machine is capable of lateral and longitudinal adjustment and also capable of a zigzig adjustment, said last adjustment being availed of when giving a wave or a zigzag effect to the material operated on.

To my knowledge, no machine has yet been produced that is capable of adjustment in more than one direction and any structure or machine capable of forming crush-work wherein two or more adjustments of the machine are used, falls within the spirit of my invention.

Obviously, the present machine, as illustrated in the drawings, is susceptible of modifications and I wish to avail myself of all such falling within the spirit of my invention.

Having described my invention, I claim:

1. In a machine for making crush work, styli supporting means, certain of said styli supporting means being movable in longitudinal direction and all of said styli supporting means being movable in lateral direction, and a series of styli arranged in parallel rows in said supporting means, whereby each row of styli is extensible longitudinally in said supporting means independently of the other rows.

2. In a machine of the character described, a series of styli arranged in parallel rows, and means for simultaneously moving alternate rows of said styli in opposite directions.

3. In a machine for making crush-work, means for engaging the work at certain points, and means for simultaneously moving some of the engaging means in one direction and other engaging means in an opposite direction.

4. In a machine of the character described, a plurality of work engaging means arranged in rows, means for moving each row of said work engaging means independently of the other rows, and means for moving all of the rows of said work engaging means laterally.

5. In a machine of the character described, a series of styli, means for moving the styli longitudinally, means for moving the styli laterally, means for restoring the styli to their original positions, and means for simultaneously moving some of the styli longitudinally in one direction and others longitudinally in an opposite direction.

6. In a machine for fulling fabrics, a plurality of juxtaposed channel members, a series of fabric engaging means arranged in each channel member, means for moving each series of fabric engaging means longitudinally in the corresponding channel member, and links mounted on certain of said channel members and operatively connected to the adjacent channel members whereby all of said channel members can be moved laterally.

7. In a machine for making crush-work, a series of juxtaposed channels adapted to receive work-holding means, and means for moving some of said channels longitudinally in one direction and others in another direction.

8. In a machine for making crush-work, a series of juxtaposed channels adapted to receive work-holding means, means for extending and restoring the work-holding means in the channels, means for laterally extending and restoring the channels, and means for imparting longitudinal movement to some channels relative to others.

9. In a machine for making crush-work, a series of juxtaposed channels adapted to receive work-holding means, and means for moving alternate channels longitudinally in opposite directions.

10. In a machine for fulling fabrics, a plurality of juxtaposed supporting members adapted to receive fabric engaging means, and means mounted on certain of said supporting members and having slot and pin connections with the adjoining supporting members whereby all of said members can be moved laterally.

11. In a machine of the character described, a series of channel members arranged in juxtaposed relation, a series of stylus carrying members arranged in each channel member, means for operatively connecting the adjoining stylus carrying members of each channel member, and means for positioning said stylus carrying members.

12. In a machine of the character described, a series of channels in juxtaposed relation, a series of stylus-carrying blocks in the channels, slotted link connections between adjacent blocks, and means for extending and restoring the blocks with relation to each other.

13. In a machine of the class described, a pair of rails, a series of laterally moving guide members supported on said rails, means for movably interengaging the alternate guide members with said rails, and work engaging means in series on said guide members, the series on each guide member being movable longitudinally thereon independently of the series of the adjoining guide members.

14. In a machine of the character described, a series of channels adapted to receive work-holding means, connecting means between the channels whereby said channels may be extended laterally and longitudinally.

15. In a machine of the character described, a series of juxtaposed channels, a series of stylus-carrying blocks in said channels, said blocks being connected by slotted links, slotted links connecting the channels, means for longitudinally extending the blocks in the channels, and means for extending the channels.

16. In a machine of the character described, a series of juxtaposed channels, work-holding means within said channels, rack teeth on alternate channels, a set of pinions for alternately disposed channels, and means for imparting rotation to said pinions.

17. In a machine of the character described, a series of juxtaposed supporting members, a plurality of styli receiving blocks slidably arranged in a row in each member, each row of blocks being extensible on its respective member independently of the other rows of blocks, and means for moving alternate supporting members longitudinally.

18. In a machine of the character described, a pair of rails, a series of juxtaposed channels on said rails, alternate channels being provided with guide studs adapted to slide within said rails, said alternate channels having a link pivotally secured thereto, said link having a slot and pin connection with adjacent channels, and means for imparting opposite longitudinal movement to said adjacent channels.

19. In a machine of the character described, a pair of rails, a series of juxtaposed channels on said rails, alternate channels being provided with guide studs adapted to slide within said rails, said alternate channels having a link pivotally secured thereto, said link having a slot and pin connection with adjacent channels, racks on said adjacent channels, pinions engaging said racks, and means for rotating said pinions in opposite directions.

20. In a machine for making crush-work, a series of juxtaposed channels adapted to receive work-holding means, means for moving alternate channels longitudinally in opposite directions, and means for restoring said channels to their original positions.

21. In a machine of the class described, a series of juxtaposed channel members adapted to receive fabric engaging means, means for moving certain of said channel members in opposite directions, and means adapted to abut one end of each channel member for alining said channel members when in normal position.

In testimony whereof I hereunto affix my signature this 20th day of November, 1920.

EDWARD W. WIESE, Sr.